United States Patent
Feng et al.

(10) Patent No.: US 11,909,458 B2
(45) Date of Patent: *Feb. 20, 2024

(54) METHOD FOR ANTENNA CALIBRATION AND ACTIVE ANTENNA SYSTEM FOR USE IN ANTENNA CALIBRATION

(71) Applicant: Telefonaktiebolaget LM Ericsson (publ), Stockholm (SE)

(72) Inventors: Ang Feng, Beijing (CN); Jinlai He, Beijing (CN); Yaxin Xing, Beijing (CN); Guangsheng Guo, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,549

(22) Filed: Sep. 14, 2022

(65) Prior Publication Data
US 2023/0009403 A1    Jan. 12, 2023

Related U.S. Application Data

(63) Continuation of application No. 17/291,104, filed as application No. PCT/CN2018/114005 on Nov. 5, 2018, now Pat. No. 11,451,311.

(51) Int. Cl.
*H04B 17/12* (2015.01)
*H04B 17/14* (2015.01)
(Continued)

(52) U.S. Cl.
CPC ........... *H04B 17/12* (2015.01); *H04B 1/7075* (2013.01); *H04B 17/14* (2015.01); *H04J 13/0022* (2013.01)

(58) Field of Classification Search
CPC ...... H04B 17/12; H04B 1/7075; H04B 17/14; H04B 7/0408; H04B 7/06; H04J 13/0022
(Continued)

(56) References Cited

U.S. PATENT DOCUMENTS

| 2010/0087227 A1 | 4/2010 | Francos et al. |
| 2012/0001810 A1 | 1/2012 | Soualle et al. |

(Continued)

FOREIGN PATENT DOCUMENTS

| CN | 102396105 A | 3/2012 |
| CN | 102830298 A | 12/2012 |

(Continued)

OTHER PUBLICATIONS

International Search Report and Written Opinion dated May 30, 2019 in International Application No. PCT/CN2018/114005 (6 pages total).

(Continued)

*Primary Examiner* — Don N Vo
(74) *Attorney, Agent, or Firm* — Rothwell, Figg, Ernst & Manbeck, P.C.

(57) ABSTRACT

A method for antenna calibration for an active antenna system is disclosed. According to an embodiment, test signals are generated for multiple antennas of the active antenna system. The test signals are transmitted via the multiple antennas. A first signal that results from the transmission of the test signals is received over the air. A second signal is received from a coupler network of the active antenna system. The coupler network is configured to generate coupled signals of the test signals and combine the coupled signals into the second signal. Calibration information for compensating an influence of the coupler network is determined based on the first and second signals. An active antenna system is also disclosed for use in antenna calibration.

20 Claims, 8 Drawing Sheets

(51) Int. Cl.
  *H04B 1/7075* (2011.01)
  *H04J 13/00* (2011.01)
(58) Field of Classification Search
  USPC .......................................... 375/140–145, 224
  See application file for complete search history.

(56) References Cited

U.S. PATENT DOCUMENTS

| | | |
|---|---|---|
| 2012/0139776 A1 | 6/2012 | Malmqvist et al. |
| 2014/0269871 A1 | 9/2014 | Huynh |
| 2018/0212324 A1 | 7/2018 | Tatomir |
| 2018/0254839 A1 | 9/2018 | Yuan et al. |

FOREIGN PATENT DOCUMENTS

| | | |
|---|---|---|
| CN | 103229354 A | 7/2013 |
| CN | 105940552 A | 9/2016 |
| WO | 2018/172451 A1 | 9/2018 |

OTHER PUBLICATIONS

3GPP TR 37.843 V15.0.0, Dec. 2017, 3rd Generation Partnership Project; Technical Specification Group Radio Access Network; E-UTRA and UTRA; Radio Frequency (RF) requirement background for Active Antenna System (AAS) Base Station (BS) radiated requirements (Release 15) (77 pages total).

Vieira, Joao et al., Reciprocity Calibration for Massive MIMO: Proposal, Modeling and Validation, Dept. of Electrical and Information Technology, Lund University, Sweden, Feb. 21, 2017, arXiv:1606.05156v3 [cs.IT], (14 pages total).

Foegelle, Michael D., The Future of MIMO Over-the-Air Testing, Radio Communications, IEEE Communications 4 Magazine, Sep. 2014, pp. 134-142 (9 pages total).

METHOD FOR ANTENNA CALIBRATION AND ACTIVE ANTENNA SYSTEM FOR USE IN ANTENNA CALIBRATION

CROSS-REFERENCE TO RELATED APPLICATIONS

This application is a continuation of Ser. No. 17/291,104 filed on May 4, 2021 (status pending), which is the 35 U.S.C. § 371 National Stage of International Patent Application No. PCT/CN2018/114005, filed on Nov. 5, 2018. The above identified applications are incorporated by this reference.

TECHNICAL FIELD

Embodiments of the disclosure generally relate to wireless communication, and, more particularly, to a method for antenna calibration and an active antenna system for use in antenna calibration.

BACKGROUND

This section introduces aspects that may facilitate better understanding of the present disclosure. Accordingly, the statements of this section are to be read in this light and are not to be understood as admissions about what is in the prior art or what is not in the prior art.

Massive multiple-input multiple-output (MIMO), as a key technology in the 5th generation (5G) communication technology, can greatly improve the cell coverage and capacity by employing a large number of antennas at base station. Beamforming is one realization and widely used in active antenna system (AAS). To guarantee effective beamforming, antenna calibration (AC) is required to achieve good phase alignment among radio channels. The phase is defined from baseband to antenna reference point (ARP). However, AC loop is usually not only from baseband to ARP, but also includes the feedback path, i.e. from ARP to antenna interface transceiver (AI TRX). The phase difference between ARP and AI TRX needs to be compensated during each AC event. For this reason, coupler network calibration is necessary.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for antenna calibration.

According to one aspect of the disclosure, there is provided a method for antenna calibration for an active antenna system. The method comprises generating test signals for multiple antennas of the active antenna system. The method further comprises transmitting the test signals via the multiple antennas. The method further comprises receiving, over the air, a first signal that results from the transmission of the test signals. The method further comprises receiving a second signal from a coupler network of the active antenna system that is configured to generate coupled signals of the test signals and combine the coupled signals into the second signal. The method further comprises determining calibration information for compensating an influence of the coupler network, based on the first and second signals.

In an embodiment of the disclosure, the test signals carry training sequences.

In an embodiment of the disclosure, the test signals are generated based on multi-carrier code division multiple access (MC-CDMA).

In an embodiment of the disclosure, generating the test signals comprises generating a root sequence. Generating the test signals further comprises generating spreading codes for the multiple antennas. Generating the test signals further comprises calculating, for each of the multiple antennas, a product between the root sequence and one of the spreading codes.

In an embodiment of the disclosure, the root sequence is stored in a common memory shared between the multiple antennas.

In an embodiment of the disclosure, the generating of the root sequence, the generating of the spreading codes and the calculating of the products are performed by the active antenna system.

In an embodiment of the disclosure, generating the root sequence comprises generating an initial root sequence in frequency domain. Generating the root sequence further comprises transforming the initial root sequence into the root sequence by inverse fast Fourier transformation (IFFT).

In an embodiment of the disclosure, the initial root sequence is a pseudo noise sequence.

In an embodiment of the disclosure, the pseudo noise sequence is one of: a Zadoff-Chu sequence; an M-sequence; and a Gold sequence.

In an embodiment of the disclosure, the spreading codes are generated by using one of: Hadamard matrix and Walsh matrix.

In an embodiment of the disclosure, the test signals are generated for the multiple antennas simultaneously. The test signals are transmitted via the multiple antennas simultaneously.

In an embodiment of the disclosure, the multiple antennas are divided into subgroups. The generating of the test signals, the transmitting of the test signals, the receiving of the first signal and the receiving of the second signal are performed for each of the subgroups respectively.

In an embodiment of the disclosure, the subgroups include common subgroups and one additional subgroup. A union set of the common subgroups is a set of the multiple antennas and an intersection between any two of the common subgroups is an empty set. The one additional subgroup includes, for each subgroup in the common subgroups, a member from the subgroup.

In an embodiment of the disclosure, determining the calibration information comprises obtaining first inphase and quadrature (IQ) data from the first signal. Determining the calibration information further comprises obtaining second IQ data from the second signal. Determining the calibration information further comprises determining, as the calibration information, a phase difference between the first and second IQ data.

According to another aspect of the disclosure, there is provided an active antenna system. The active antenna system comprises a digital signal generator configured to generate digital signals for multiple antennas. The active antenna system further comprises multiple transmitters configured to process the digital signals into test signals for transmission via the multiple antennas. The active antenna system further comprises the multiple antennas configured to transmit the test signals. The active antenna system further comprises a coupler network connected between the multiple transmitters and the multiple antennas and configured to generate coupled signals of the test signals and combine the coupled signals into a feedback signal. The active antenna system further comprises a feedback receiver configured to receive the feedback signal.

In an embodiment of the disclosure, the digital signals are training sequences.

In an embodiment of the disclosure, the digital signal generator is configured to generate the digital signals based on MC-CDMA.

In an embodiment of the disclosure, the digital signal generator comprises a root sequence generator configured to generate a root sequence. The digital signal generator further comprises a spreading code generator configured to generate spreading codes for the multiple antennas. The digital signal generator further comprises a multiplication unit configured to calculate, for each of the multiple antennas, a product between the root sequence and one of the spreading codes.

In an embodiment of the disclosure, the root sequence is stored in a common memory shared between the multiple antennas.

In an embodiment of the disclosure, the root sequence generator is configured to generate the root sequence by generating an initial root sequence in frequency domain and transforming the initial root sequence into the root sequence by IFFT.

In an embodiment of the disclosure, the digital signal generator is configured to generate the digital signals for the multiple antennas simultaneously.

In an embodiment of the disclosure, the multiple antennas are divided into subgroups. The digital signal generator is configured to generate the digital signals for each of the subgroups respectively.

In an embodiment of the disclosure, the subgroups include common subgroups and one additional subgroup. A union set of the common subgroups is a set of the multiple antennas and an intersection between any two of the common subgroups is an empty set. The one additional subgroup includes, for each subgroup in the common subgroups, a member from the subgroup.

According to some embodiment(s) of the disclosure, the calibration accuracy can be improved since the calibration configuration is closely same with practical use.

BRIEF DESCRIPTION OF THE DRAWINGS

These and other objects, features and advantages of the disclosure will become more apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
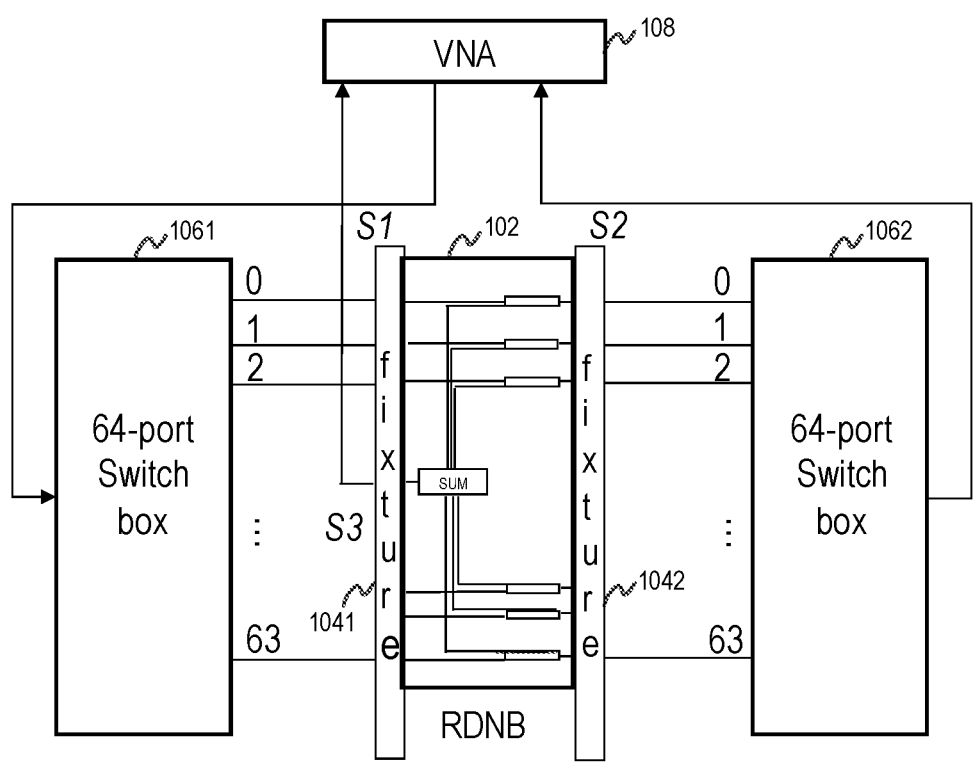
FIG. 1 is a diagram illustrating the existing solution for antenna calibration.

Currently, there are two commonly-used calibration methods. One is no calibration but guaranteed by hardware (HW). This puts stringent requirement on radio distribution network board (RDNB)/antenna filter unit (AFU) production. That is, HW must guarantee coherent phase of antenna calibration (AC) loopback path for each branch, leading to high-cost and difficulty in implementation. The other one is cascading calibration method, which needs to calibrate the S parameter of RDNB/AFU and AC cable separately and then cascade them. FIG. 1 shows a schematic illustration for RDNB/AFU calibration. As shown, an exemplary example of N=64 is provided, where N is the number of branches which are to be calibrated. The RDNB 102 is mounted by the fixtures 1041 and 1042. The input side of the RDNB 102 is connected with the switch box 1061 via 64 cables and the output side of the RDNB 102 is connected with the switch box 1062 via 64 cables. A test signal is generated by the vector network analyzer (VNA) 108 and input into the switch box 1061. Then, an output signal from the switch box 1062 is received by the VNA 108. A feedback signal from the RDNB 102 (specifically, the "SUM" unit) is also received by the VNA 108. Therefore, this method needs complicated assembling, fixture, switch box, VNA, over 2*N cables and extra connectors, which is costly and complicated to setup. Moreover, the complicated testbench also needs to be calibrated before coupler network calibration. Calibration error caused by the cascading method itself and wrong operation by operators in factory is also unavoidable.

The present disclosure proposes an improved solution for antenna calibration. Hereinafter, the solution will be described in detail with reference to FIGS. 2-9.

Figure 2:
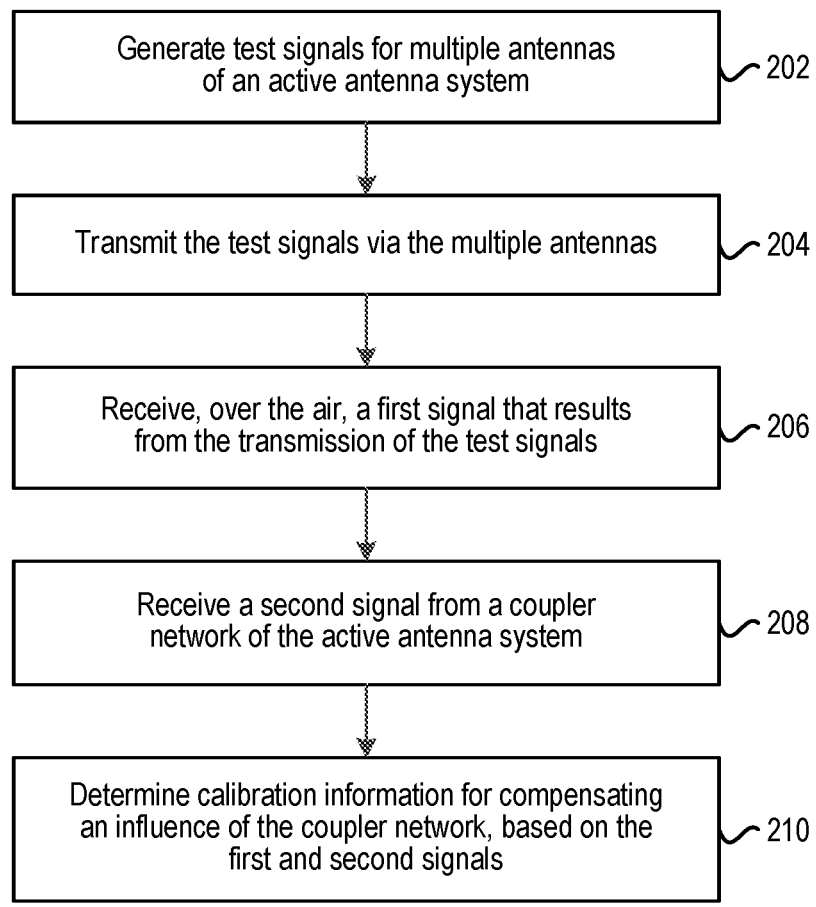
FIG. 2 is a flowchart illustrating a method for antenna calibration according to an embodiment of the disclosure.

FIG. 2 is a flowchart illustrating a method for antenna calibration according to an embodiment of the disclosure. The method may be applicable to an active antenna system comprising multiple antennas and a coupler network (also referred to as RDNB or AFU). At block 202, test signals are generated for the multiple antennas of the active antenna system. For example, the test signals may be generated based on multi-carrier code division multiple access (MC-CDMA). In the case that the test signals carry training sequences, the generation based on MC-CDMA may include blocks 312-316 of FIG. 3.

Figure 4:
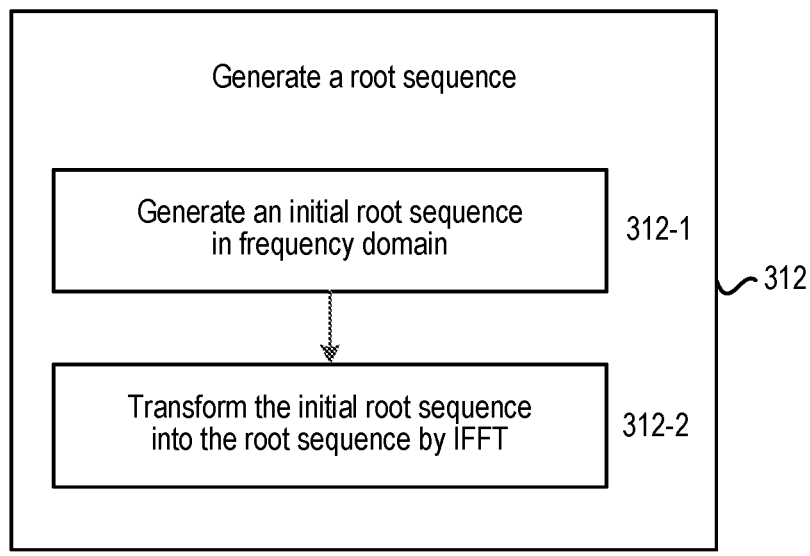
FIG. 4 is a flowchart for explaining the method of FIG. 3.

At block 312, a root sequence is generated. Since MC-CDMA is used, the root sequence is generated based on orthogonal frequency division multiplexing (OFDM), where one root sequence may be equivalent to one OFDM symbol. For example, block 312 may be implemented as blocks 312-1 and 312-2 as shown in FIG. 4. At block 312-1, an initial root sequence is generated in frequency domain. The initial root sequence may be any pseudo noise sequence such as Zadoff-Chu (ZC) sequence, M-sequence, Gold sequence, or the like. In the case that ZC sequence is used, a low peak-to-average ratio (PAR) root sequence may be generated. At block 312-2, the initial root sequence is transformed into the root sequence by inverse fast Fourier transformation (IFFT).

At block 314, spreading codes are generated for the multiple antennas. Since MC-CDMA is used, all of the spreading codes are orthogonal to each other. Various techniques for generation of orthogonal spreading codes may be used, such as using Hadamard matrix, Walsh matrix, or the like. In the case that Hadamard matrix is used, no complex multiplication is needed. Different antennas may have different spreading codes. Suppose the number of the multiple antennas (or antenna branches) is N. Then, for each antenna, the corresponding spreading code has N components. At block 316, a product between the root sequence and one of the spreading codes is calculated for each of the multiple antennas. In the above example of N antennas, for each antenna, the root sequence (equivalent to one OFDM symbol) may be first repeated to N root sequences (equivalent to N OFDM symbols) and then multiplied with the corresponding spreading code having N components.

Thus, the generation of the training sequences is divided into two parts. The first part generates the root sequence, which is the same to all of the multiple antennas. The second part exploits direct-spreading to the root sequence (equivalent to an OFDM symbol) to generate MC-CDMA symbols. Then, the resulting products (training sequences) at block 316 may undergo further processing to become the test signals for transmission via the multiple antennas. The further processing may be performed by the transceiver array of the active antenna system, which may be well known to those skilled in the art.

As a first option, blocks 312-316 may be performed by a hardware circuit (such as integrated circuit, field programmable gate array (FPGA), or the like) in the active antenna system. For example, the hardware circuit may be part of a digital radio component of the active antenna system. For the first option, the root sequence may be stored in a common memory shared between the multiple antennas. The common memory is a memory which is usually used in an active antenna system to save memory size. Thus, the size of the common memory is small. Since the root sequence is the same to all antenna branches and stored in the common memory, the limitation on the size of the common memory can be overcome. As a second option, blocks 312-316 may be performed by a dedicated hardware circuit separate from the active antenna system. In this case, the dedicated hardware circuit needs to be connected with the active antenna system to provide the generated digital signals (the products at block 316) to the active antenna system. This leads to relatively higher cost than the first option. Although the test signals are described as carrying training sequences hereinabove, the present disclosure is not limited to training signals and any other suitable test signals may be used instead.

Figure 3:
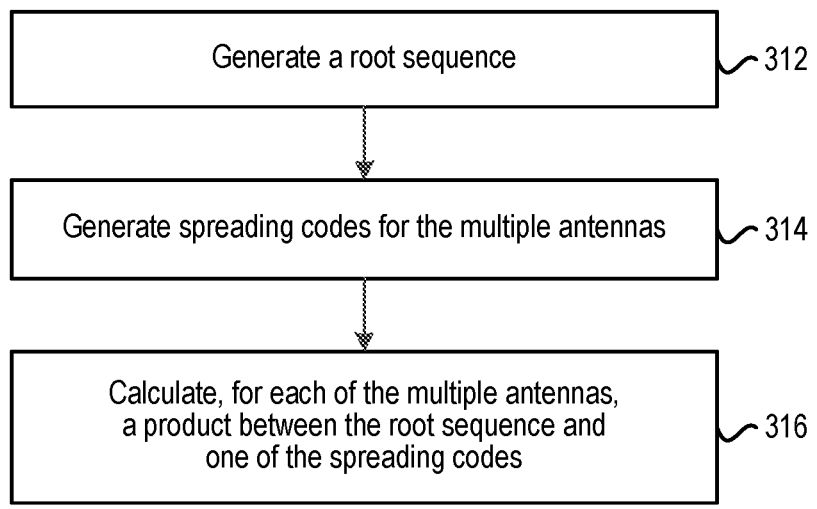
FIG. 3 is a flowchart for explaining the method of FIG. 2.
Figure 5:
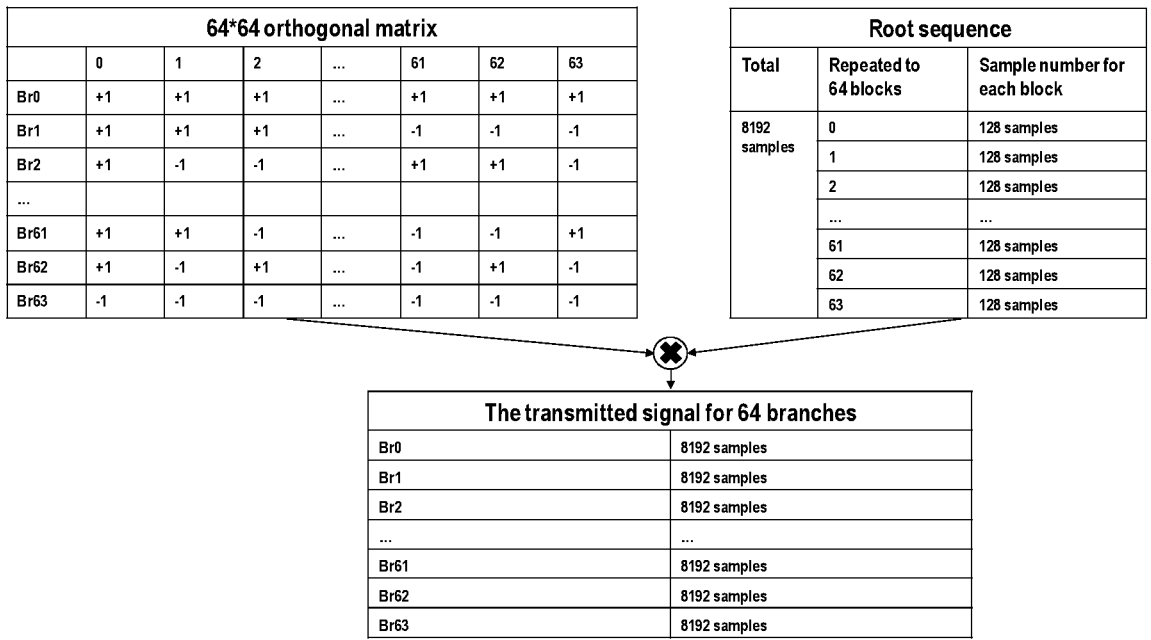
FIG. 5 shows an exemplary example for explaining the method of FIG. 3.
Figure 6:
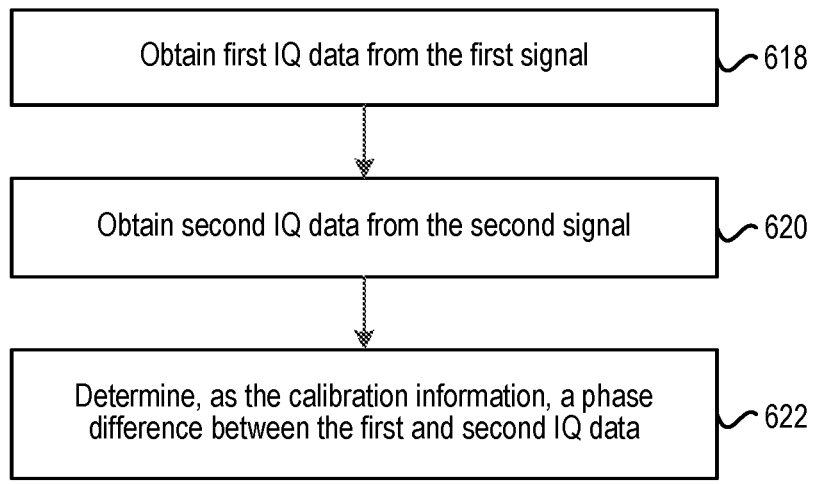
FIG. 6 is a flowchart for explaining the method of FIG. 2.

FIG. 5 shows an exemplary example for explaining the method of FIG. 3. In this exemplary example, suppose the number of antenna branches (denoted by N) is 64, the sampling rate is 122.88 Mhz, and the subcarrier spacing is 960 Khz. Then, the length of the root sequence (denoted by $N_s$) can be calculated as: 122.88 Mhz/960 Khz=128. As shown in FIG. 5, the spreading codes are generated as a 64*64 orthogonal matrix which is a Hadamard matrix. The root sequence (a ZC sequence in this example) having the length of 128 samples is repeated into $N_{eq}$=64 blocks, which constitute a column vector. For the first branch Br0, the column vector is multiplied by the first row of the orthogonal matrix, resulting in 8192 samples. Similarly, for the i-th branch (where 2≤i≤64), the column vector is multiplied by the i-th row of the orthogonal matrix. Thus, the total length of one sequence to one branch is $N_s * N_{eq}$=8192. Thus, the maximum size for the common memory is only 128 samples. The test signals resulting from the training sequences in this example have similar power spectrum density (PSD) as 100M new radio (NR) signal, but with lower PAR.

At block 204, the test signals are transmitted via the multiple antennas. For example, the test signals may be transmitted by the active antenna system in an anechoic chamber to perform an over-the-air (OTA) test. The active antenna system may be placed on a testbench. Since the test signals are transmitted over the air, the calibration configuration is closely same with practical use. Compared with the existing cascading calibration method, extra assembling and connectors are not required, leading to convenient testbench setup and low cost. At block 206, a first signal that results from the transmission of the test signals is received over the air. A signal analyzer may be placed in the anechoic chamber to receive the first signal. At block 208, a second signal is received from a coupler network of the active antenna system. The coupler network is configured to generate coupled signals of the test signals and combine the coupled signals into the second signal. The second signal may be received by a feedback receiver (e.g. in an antenna interface transceiver) of the active antenna system.

At block 210, calibration information for compensating an influence of the coupler network is determined based on the first and second signals. For example, block 210 may be implemented as blocks 618-622 of FIG. 6. At block 618, first inphase and quadrature (IQ) data is obtained from the first signal. Block 618 may be performed by the signal analyzer. The obtained first IQ data may be stored in a memory of the signal analyzer. At block 620, second IQ data is obtained from the second signal. Block 620 may be performed by the feedback receiver. The obtained second IQ data may be stored in a memory (e.g. Ethernet test access point, simply referred to as eTAP) of the active antenna system.

At block 622, a phase difference between the first and second IQ data is determined as the calibration information. As an exemplary example, block 622 may be implemented as the following sub-blocks. At the first sub-block, de-spreading is performed. Assume the signal received by the signal analyzer or the feedback receiver (denoted by w) can be expressed as: w=[$w_1(n)$, $w_2(n)$, . . . , $w_N(n)$], where N is the number of antenna branches and n is the index number of a sample. Then, the received symbol of branch m can be expressed as:

$$\hat{x}^{(m)}(n) = \sum_{l=1}^{N} w_l(n) H(m,l),$$

where H is a N×N Hadamard matrix. At the second sub-block, synchronization is performed. Specifically, cross-correlation xcorr between a reference symbol x(n) and the received symbol $\hat{x}^{(m)}(n)$ is performed, which can be expressed as:

$$c = xcorr(\hat{x}^{(m)}(n), x(n)),$$

where the peak of c indicates the start point of symbol.

At the third sub-block, FFT is applied to the received symbol, which can be expressed as:

$$\hat{X}^{(m)}(k) = \sum_{n=0}^{N_s-1} \hat{x}^{(m)}(n) \exp\left(-j\frac{2\pi nk}{N_s}\right), k = 0, \ldots, N_s,$$

where $N_s$ is the number of samples in one OFDM symbol. At the fourth sub-block, the phase at active subcarriers is estimated. Note that other subcarriers are zero. This can be expressed as:

$$\partial(m, k) = \begin{cases} \frac{\hat{x}^{(m)}(k)}{X(k)}, & k \in \text{ active subcarriers} \\ 0, & \text{otherwise} \end{cases}$$

where X(k) is the root sequence which is a ZC sequence. At the fifth sub-block, p-order polynomial fitting is utilized to smooth the curve. The estimated phase can be expressed as:

$$\theta(m,k)=a_0+a_1k+\ldots+a_pk^p\approx\tilde{\theta}(m,k).$$

Then, the above first to fifth sub-blocks are repeated to get phase estimation θ(m,k) for all branches. The difference between the two captured data is the wanted distortion caused by the coupler network. The resultant delay and phase may be stored into the database of the active antenna system for future use.

Blocks 202-208 may be performed in various ways. As an option, the test signals may be generated for the multiple antennas simultaneously. Correspondingly, the test signals may be transmitted via the multiple antennas simultaneously. The receiving of the first signal at block 206 and the receiving of the second signal at block 208 may also be performed for the multiple antennas simultaneously. In this way, a reference clock is not necessary to be connected between the signal analyzer and the feedback receiver since all of the multiple antennas are calibrated at the same time.

As another option, the multiple antennas may be divided into subgroups. Blocks 202-208 (i.e. the generating of the test signals, the transmitting of the test signals, the receiving of the first signal and the receiving of the second signal) may be performed for each of the subgroups respectively. As an example for this option, the subgroups may include common subgroups and one additional subgroup. A union set of the common subgroups is a set of the multiple antennas and an intersection between any two of the common subgroups is an empty set. The one additional subgroup includes, for each subgroup in the common subgroups, a member from the subgroup. The one additional subgroup may be used as a reference subgroup to compensate the phase drift occurring due to the signal analyzer and the feedback receiver when calibration is performed for different common subgroups. Therefore, it should be noted that two blocks shown in succession in the figures may, in fact, be executed substantially concurrently, or the blocks may sometimes be executed in the reverse order, depending upon the functionality involved.

Figure 7:
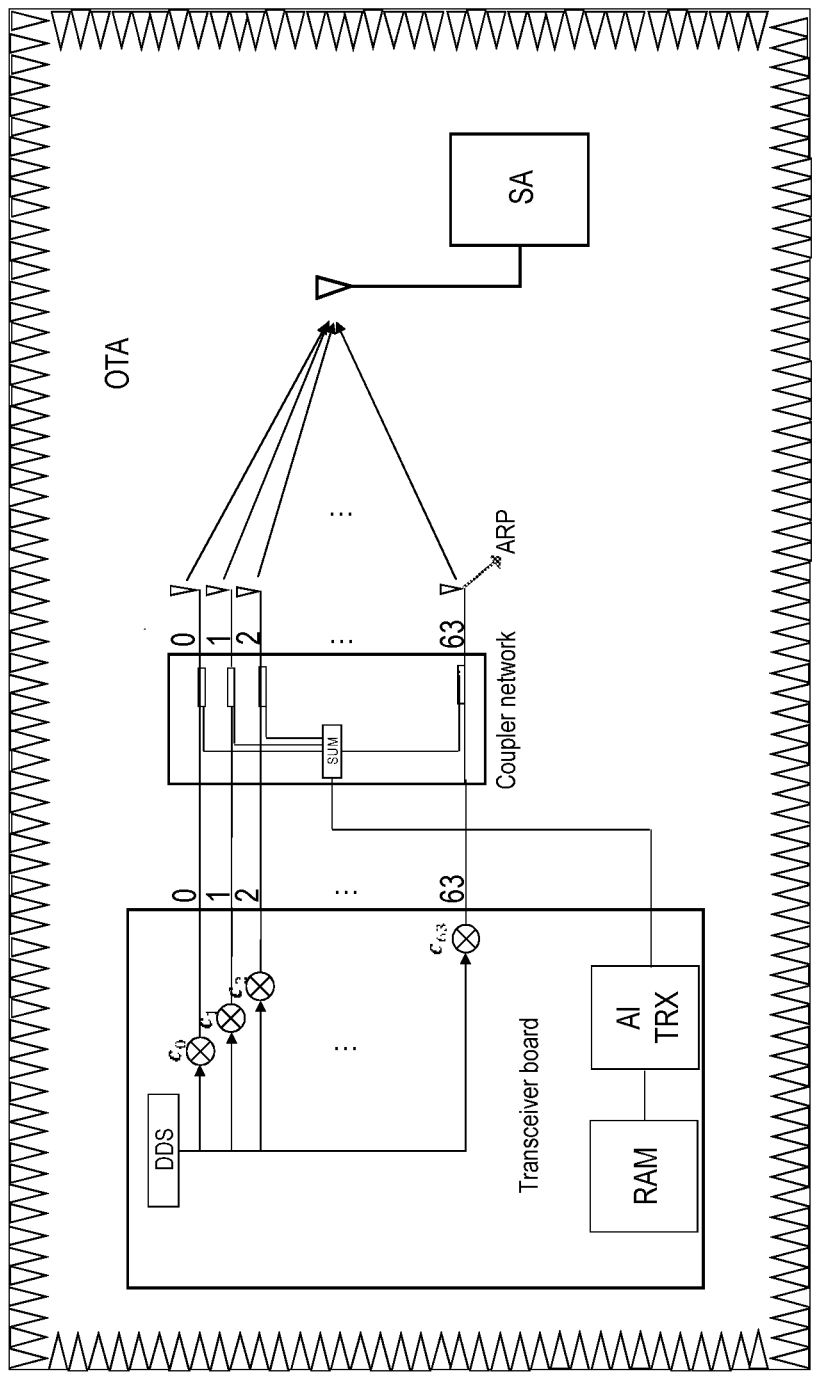
FIG. 7 shows an exemplary example for explaining the method of FIG. 2.

FIG. 7 shows an exemplary example for explaining the method of FIG. 2. In this exemplary example, the same configuration as that described with respect to FIG. 5 is used. As shown, an active antenna system (AAS) product includes a transceiver board, a coupler network and an antenna array which are integrated together. The AAS product is placed in an OTA chamber to perform an OTA test. The root sequence is stored in a common memory of a digital data source (DDS) when it has been generated by the DDS for the first time. The DDS may be provided in the digital radio ASIC/FPGA of the AAS product. The root sequence is sent to each antenna branch and multiplied by a corresponding spreading code to generate orthogonal sequences. The generated orthogonal sequences are processed into test signals by a transceiver array (not shown) provided on the transceiver board.

After the test signals are sent to the antenna reference point (ARP), two receivers are enabled for signal capture simultaneously. The first receiver is a signal analyzer (SA) with antenna, which retrieves signal in the manner of OTA. The SA may use an IQ analyzer to capture and store IQ data in its internal memory. The feedback receiver is an antenna interface transceiver (AI TRX), which retrieves signal from the coupler network. The AI TRX may use a random access memory (RAM) to capture and store IQ data. Since the AI TRX and the RAM is also used in AC function, this configuration does not need extra HW expense. The IQ data stored in the SA and the RAM may be read by wireless communication and undergo processing to determine the phase difference. In this way, the whole process may be automated, avoiding the error caused by improper operation.

As an option, signals on all branches may be triggered simultaneously, and captured in the two receivers simultaneously. Thus, a reference clock is not necessary to be connected between the SA and the AI TRX since all 64 branches are calibrated at the same time. As another option, if it is difficult to trigger all branches at the same time (depending on HW implementation), N branches may be divided into M sub-calibration groups (SCGs). Each SCG contains N/M branches, where N/M is an integer. The N/M branches in one SCG may be calibrated simultaneously. The calibration may be performed over M times to extend to all branches. In this case, the phase drift due to the SA and the AI TRX should be considered. Otherwise, the result will include wrong additional phase between the SA and the AI TRX. To overcome this issue, in the M times of measurement, one additional SCG may be utilized, which includes one branch from each of the original M SCGs. And this special branch picked from the original SCGs may be used as a reference branch, and taken into calculation. Thus, there may be totally (M+1) SCGs.

Figure 8:
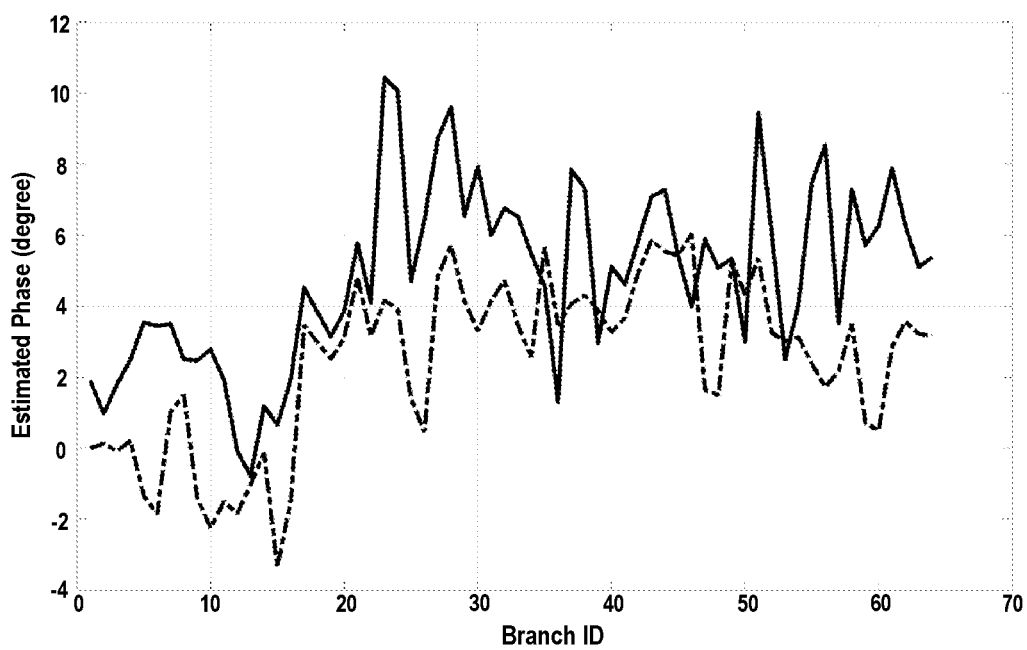
FIG. 8 shows the calibration result for the example of FIG. 7.

FIG. 8 shows the calibration result for the example of FIG. 7. The calibration result was obtained by using signal processing to analyze the phase difference of N branches at the ARP and the AI TRX. By comparing the captured IQ data with a reference signal (e.g. the root sequence), the phase of 64 branches for the SA and the AI TRX was estimated respectively. The dotted line is the phase estimation for the IQ data from the SA and the solid line is for the IQ data from the RAM of the AI TRX. The difference of these two lines is the wanted coupler calibration results for 64 branches. The resultant phase difference may be stored in a database and will be used in AC algorithm to compensate phase mismatch between the branches due to the coupler network.

Figure 9:
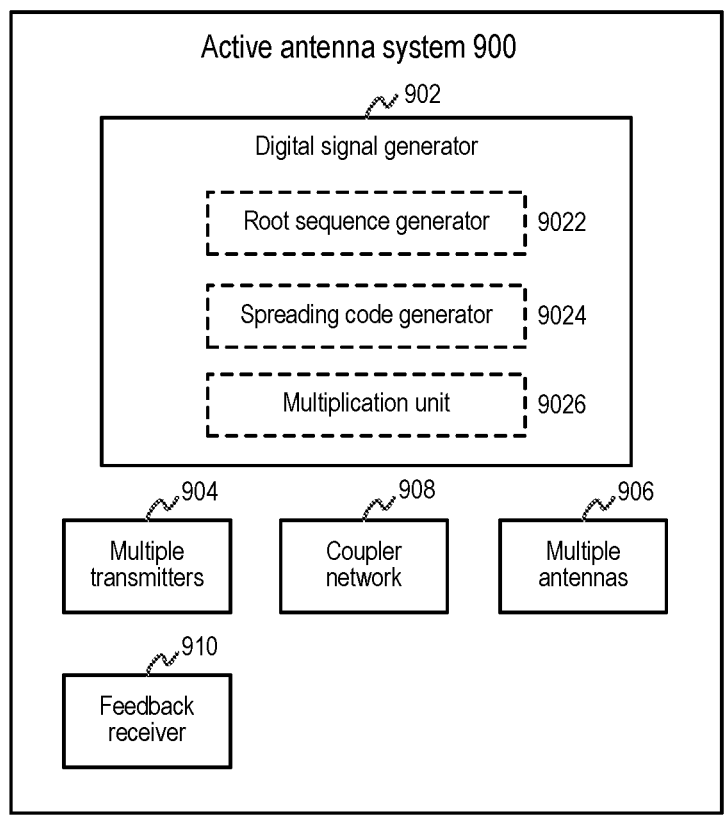
FIG. 9 is a block diagram showing an active antenna system according to an embodiment of the disclosure.

FIG. 9 is a block diagram showing an active antenna system according to an embodiment of the disclosure. As shown, the active antenna system 900 comprises a digital signal generator 902, multiple transmitters 904, multiple antennas 906, a coupler network 908 and a feedback receiver 910. The digital signal generator 902 is configured to generate digital signals for the multiple antennas 906, as described above with respect to blocks 312-316 of FIG. 3. The multiple transmitters 904 are configured to process the digital signals into test signals for transmission via the multiple antennas 906. The multiple transmitters 904 may be the transmission portion of a transceiver array for use in various AAS products. The multiple antennas 906 are configured to transmit the test signals. The coupler network 908 is connected between the multiple transmitters 904 and the multiple antennas 906 and configured to generate coupled signals of the test signals and combine the coupled signals into a feedback signal. The coupler network 908 may also be referred to as RDNB or AFU. The feedback receiver 910 is configured to receive the feedback signal.

As an example, the digital signal generator 902 may include a root sequence generator 9022, a spreading code generator 9024 and a multiplication unit 9026. The root sequence generator 9022 may be configured to generate a root sequence, as described above with respect to block 312 of FIG. 3. The spreading code generator 9024 may be configured to generate spreading codes for the multiple antennas 906, as described above with respect to block 314 of FIG. 3. The multiplication unit 9026 may be configured to calculate, for each of the multiple antennas 906, a product between the root sequence and one of the spreading codes, as described above with respect to block 316 of FIG. 3.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method for antenna calibration for an antenna system, the method comprising:
generating test signals for a plurality of antennas of the antenna system;
using the plurality of antennas to transmit the test signals;
receiving a first signal that results from the transmission of the test signals;
receiving a second signal from a coupler network of the antenna system that is configured to generate coupled signals of the test signals and combine the coupled signals into the second signal; and
determining calibration information for compensating an influence of the coupler network, based on the first and second signals.

2. The method of claim 1, wherein generating the test signals comprises:
generating a root sequence;
generating spreading codes for the plurality of antennas; and
calculating, for each of the plurality of antennas, a product between the root sequence and one of the spreading codes.

3. The method of claim 2, wherein the generating of the root sequence, the generating of the spreading codes and the calculating of the products are performed by the antenna system.

4. The method of claim 2, wherein generating the root sequence comprises:
generating an initial root sequence in frequency domain; and
transforming the initial root sequence into the root sequence by inverse fast Fourier transformation (IFFT).

5. The method of claim 4, wherein the initial root sequence is a pseudo noise sequence.

6. The method of claim 5, wherein the pseudo noise sequence is one of:
a Zadoff-Chu sequence; an M-sequence; or a Gold sequence.

7. The method of claim 2, wherein the spreading codes are generated by using a Hadamard matrix or a Walsh matrix.

8. The method of claim 1, wherein
the test signals are generated for the plurality of antennas simultaneously, and
the test signals are transmitted via the plurality of antennas simultaneously.

9. The method claim 1, wherein
the plurality of antennas are divided into subgroups, and
the generating of the test signals, the transmitting of the test signals, the receiving of the first signal and the receiving of the second signal are performed for each of the subgroups respectively.

10. The method of claim 9, wherein
the subgroups include common subgroups and one additional subgroup,
a union set of the common subgroups is a set of the plurality of antennas and wherein an intersection between any two of the common subgroups is an empty set, and
the one additional subgroup includes, for each subgroup in the common subgroups, a member from the subgroup.

11. The method of claim 1, wherein determining the calibration information comprises:
obtaining first inphase and quadrature, IQ, data from the first signal;
obtaining second IQ data from the second signal; and
determining, as the calibration information, a phase difference between the first and second IQ data.

12. An antenna system comprising:
a plurality of antennas;
a digital signal generator configured to generate digital signals for the plurality of antennas;
a plurality of transmitters configured to process the digital signals into test signals for transmission via the plurality of antennas;
a coupler network connected between the plurality of transmitters and the plurality of antennas and configured to generate coupled signals of the test signals and combine the coupled signals into a feedback signal; and
a feedback receiver configured to receive the feedback signal.

13. The antenna system of claim 12, wherein the digital signals are training sequences.

14. The antenna system of claim 12, wherein the digital signal generator is configured to generate the digital signals based on multi-carrier code division multiple access.

15. The antenna system of claim 14, wherein the digital signal generator comprises:
a root sequence generator configured to generate a root sequence;
a spreading code generator configured to generate spreading codes for the plurality of antennas; and
a multiplication unit configured to calculate, for each of the plurality of antennas, a product between the root sequence and one of the spreading codes.

16. The antenna system of claim 15, wherein the root sequence is stored in a common memory shared between the plurality of antennas.

17. The antenna system of claim 15, wherein the root sequence generator is configured to generate the root sequence by:
generating an initial root sequence in frequency domain; and
transforming the initial root sequence into the root sequence by inverse fast Fourier transformation (IFFT).

18. The antenna system of claim 12, wherein the digital signal generator is configured to generate the digital signals for the plurality of antennas simultaneously.

19. The antenna system of claim 12, wherein
the plurality of antennas are divided into subgroups, and
the digital signal generator is configured to generate the digital signals for each of the subgroups respectively.

20. The antenna system of claim 19, wherein
the subgroups include common subgroups and one additional subgroup,
a union set of the common subgroups is a set of the plurality of antennas and wherein an intersection between any two of the common subgroups is an empty set, and
the one additional subgroup includes, for each subgroup in the common subgroups, a member from the subgroup.

* * * * *